United States Patent
Okada et al.

(10) Patent No.: US 6,669,798 B1
(45) Date of Patent: Dec. 30, 2003

(54) METHOD OF MANUFACTURING A PNEUMATIC RADIAL TIRE INCLUDING FORMING A BELT LAYER FROM STRIP PIECES

(75) Inventors: Noburu Okada, Hiratsuka (JP); Kasuyuki Kabe, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/141,316

(22) Filed: Aug. 27, 1998

(30) Foreign Application Priority Data

Sep. 26, 1997 (JP) ............................................. 9-261404

(51) Int. Cl.⁷ ............................. B29D 30/70; B60C 9/18
(52) U.S. Cl. ....................... 156/117; 156/124; 156/130; 156/264; 156/907
(58) Field of Search ............................... 136/117, 907, 136/123, 124, 130, 264, 304.1, 906, 110.1

(56) References Cited

U.S. PATENT DOCUMENTS

| | | | |
|---|---|---|---|
| 2,295,542 A | * 9/1942 | Breth | 156/906 X |
| 3,276,930 A | * 10/1966 | Keefe, Jr. | 156/130 |
| 3,694,283 A | * 9/1972 | Cooper et al. | 156/264 X |
| 3,802,982 A | * 4/1974 | Alderfer | 156/906 X |
| 3,803,965 A | * 4/1974 | Alderfer | 156/907 X |
| 4,219,601 A | * 8/1980 | Inoue et al. | 156/264 X |

* cited by examiner

Primary Examiner—Adrienne C. Johnstone
(74) Attorney, Agent, or Firm—Rader Fishman & Grauer

(57) ABSTRACT

Disclosed is a method of manufacturing a pneumatic radial tire comprising the steps of feeding a strip material comprising a plurality of reinforcing cords and having a predetermined width from a standard measure feeding device which is adjustable in its feeding angle to a carrier conveyor, cutting the strip material to a predetermined size in sequence to form strip pieces while alternately moving the strip material and the carrier conveyor intermittently in synchronization with each other, transferring the strip pieces onto the carrier conveyor, forming a belt member having a length equal to a length L of a belt layer for one tire by butting the strip pieces against each other along their longitudinal edges, and using the belt member as the belt layer, wherein if a width of the strip material is A and the number of the strip pieces for forming the belt layer is N, an angle θ for cutting the strip material to the predetermined size relative to a moving direction of the standard measure feeding device is set such that the strip piece number N can be an integer in the following expression:

$$\theta = \sin^{-1}(N \times A / L).$$

3 Claims, 2 Drawing Sheets

METHOD OF MANUFACTURING A PNEUMATIC RADIAL TIRE INCLUDING FORMING A BELT LAYER FROM STRIP PIECES

BACKGROUND OF THE INVENTION

The present invention relates to a pneumatic radial tire and manufacturing method of the same, and more particularly to a pneumatic radial tire which enables many kinds productions in small quantities to be efficiently performed and manufacturing method of the same.

Generally, a belt layer for a pneumatic radial tire is formed in a manner that a wide calendar material calendered to impregnate a number of reinforcing cords with unvulcanized rubber is bias-cut to a width of a belt, the reinforcing cords having been pulled out from a creel stand and aligned with one another, a number of cut pieces obtained by the bias-cutting are joined together for forming a long belt sheet material where the cut ends thereof are left and right edges, and then this long sheet material is wound on a drum and placed in temporary stock. A belt member for one tire is obtained by pulling out the belt sheet material from the drum during belt layer formation and cutting the sheet material to a length equal to a circumference of the belt layer in a direction along the reinforcing cords.

However, a belt member for one tire is different from another in width and length depending on a tire size. Thus, for forming belt members in the above manner, belt sheet materials different from one another must be stocked for respective tire specifications. For this reason, a great many kinds of belt members were stocked, which created a problem of requiring wide stock space. The impossibility of utilizing a belt member for the other tire specifications leads to such problems of leaving end portions of belt sheet materials for respective tire specifications as waste and requiring more operations during a tire manufacturing process. Moreover, for performing production of many kinds in small quantities, it was necessary to frequently carry out setup changing work for replacing a drum having taken up a long sheet material with another at each time when tire specifications were changed.

SUMMARY OF THE INVENTION

The object of the present invention is to solve the above described problems of stock space for belt members for respective tire specifications and material waste, and also is to provide a pneumatic radial tire which enables production of many kinds in small quantities to be efficiently performed and manufacturing method of the same.

In order to achieve the above described object, a pneumatic radial tire of the present invention has a belt layer disposed radially outer to a carcass layer in a tread section of the tire, the belt layer being formed of strip pieces each comprising a plurality of reinforcing cords and having a predetermined width, the strip pieces being arranged at a predetermined angle relative to the circumferential direction of the tire, one round portion of the belt layer in the circumferential direction of the tire comprising an integral number of the strip pieces juxtaposed in a manner such that each two adjacent strip pieces butts against each other along their longitudinal edges.

According to the present invention, the strip pieces are obtained by cutting a strip material having a predetermined width to a predetermined length at a predetermined angle. In the pneumatic radial tire, if a length of the belt layer is L, a width of the strip pieces is A, an inclined angle of the strip pieces relative to the circumferential direction of the tire is θ and the number of the strip pieces is N, the inclined angle θ should preferably be set such that the number N of the strip pieces can be an integer in the following expression.

$$\theta = \sin^{-1}(N \times A / L)$$

The method manufacturing of a pneumatic radial tire of the present invention comprises the steps of feeding a strip material comprising a plurality of reinforcing cords and having a predetermined width from a standard measure feeding device which is adjustable in its feeding angle to a carrier conveyor, cutting said strip material to a predetermined size in sequence to form strip pieces while alternately moving the strip material and the carrier conveyor intermittently in synchronization with each other, transferring the strip pieces onto the carrier conveyor, forming a belt member having a length equal to a length L of a belt layer for one tire by butting the strip pieces against each other along their longitudinal edges, and using the belt member as the belt layer. In this case, if a width of the strip material is A and the number of the strip pieces for forming the belt layer is N, and an angle θ for cutting the strip material to the predetermined size relative to the moving direction of the standard measure feeding device should be set such that the number N of the strip pieces can be an integer in the following expression.

$$\theta = \sin^{-1}(N \times A / L).$$

As described above, according to the present invention, a belt layer for one round of a tire is formed by inclining at a predetermined angle the integral number of predetermined width strip pieces, each of which is composed of a plurality of reinforcing cords, and by joining these strip pieces together in a manner such that two adjacent strip pieces butts against each other along their longitudinal edges. Thus, during belt layer formation, the predetermined width strip material is cut to a predetermined size in sequence at a predetermined inclined angle, the integral number of strip pieces obtained by cutting are butted against one another along their longitudinal edges and thereby the belt layer can be formed to have a length for one tire. Even if the size of a tire to be manufactured varies, since many sizes are dealt with by changing the cutting angles, the cutting lengths and the joined number of the strip pieces, various belt layers can be formed from the same strip material. As a result, efficient production of many kinds in small quantities can be performed. Therefore, the problem of requiring stock space for respective tire specifications as well as causing material waste can be eliminated. Moreover, large scale setup changing work will be unnecessary, thus enabling high efficiency manufacturings of many kinds of tires in small quantities.

BRIEF DESCRIPTION OF THE DRAWINGS

For a more complete understanding of the present invention and the advantages thereof, reference is now made to the following detailed description taken in conjunction with the accompanying drawings, in which.

DETAILED DESCRIPTION OF THE PREFERRED EMBODIMENTS

For better understanding, the arrangement and effect of the present invention will be described below in detail with reference to the accompanying drawings.

A method of manufacturing a belt member for a pneumatic radial tire of the present invention is hereinafter described and includes a plurality of steps. One step is feeding a strip material including a plurality of reinforcing cords from a standard measure feeding device which is adjustable in feeding angle to a carrier conveyor. Another step is cutting the strip material to a predetermined size in sequence to form strip pieces having a predetermined width A while alternately moving the strip material and the carrier conveyor intermittently in synchronization with each other. The next step is transferring the strip pieces onto the carrier conveyor. Another step is determining an integer number $N_{int}$ of strip pieces necessary to form a belt member. having a desired length equal to a predetermined length L of a belt layer for the tire with the strip pieces having the predetermined width A by:

selecting a preferred cutting angle $\theta_{pre}$ for the strip pieces;

calculating a number $N_{cal}$ of strip pieces required to form the belt member by applying the following formula:

$$N_{cal}=(L/A)\times\sin\theta_{pre};$$

rounding the calculated number $N_{cal}$ of strip pieces either up or down to an integer number $N_{int}$; and setting the actual cutting angle $\theta_a$ for the integer number $N_{int}$ of strip pieces by applying the following formula:

$$\theta_a=\sin^{-1}(N_{int}\times A/L).$$

Thereafter, the next step is butting the $N_{int}$ strip pieces cut at the actual cutting angle $\theta_a$ sequentially against each other along their longitudinal edges to form the belt member having the desired length equal to the predetermined length L of the belt layer for the pneumatic tire.

Figure 1:
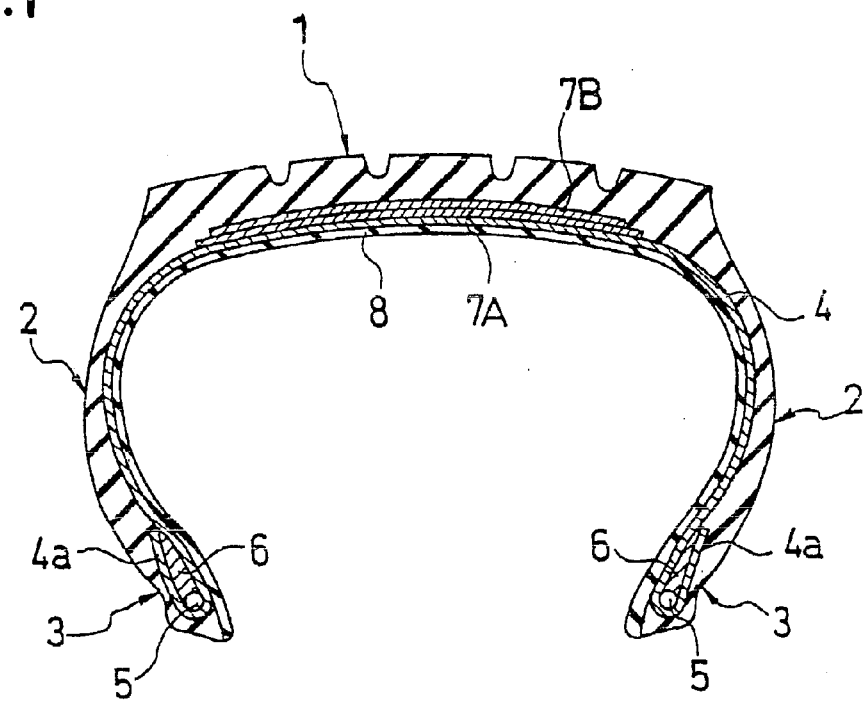
FIG. 1 is a tire meridian section view showing an example of a pneumatic radial tire of the present invention.

Referring first to FIG. 1, shown is an example of a pneumatic radial tire of the present invention, where reference numerals 1, 2 and 3 denote a tread section, a side wall section and a bead section respectively. A carcass layer 4 is disposed in the inner side of the tire, and both end portions 4a thereof are folded from the tire inner side to its outer side around bead cores 5 so as to hold bead fillers 6. Two belt layers 7A and 7B are provided in the outer peripheral side of the carcass layer 4. A reference numeral 8 denotes an inner liner layer disposed in the inner side of the tire.

Figure 2:
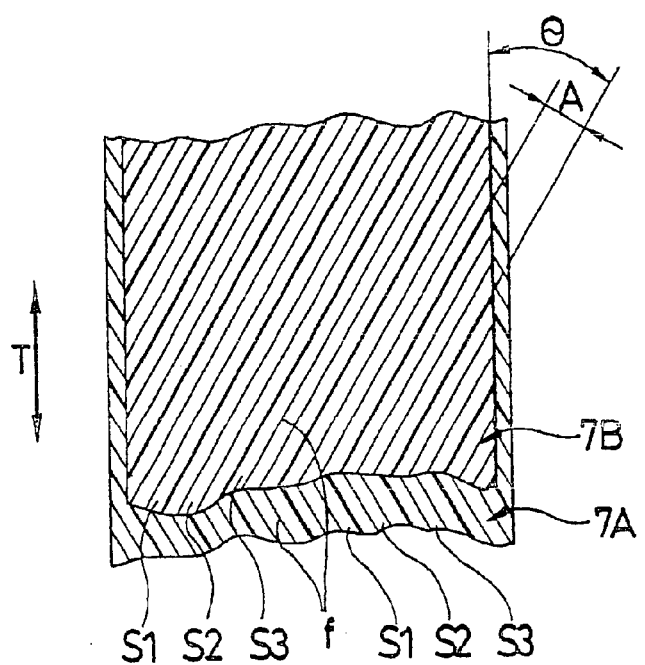
FIG. 2 is a partially broken view illustrating main portions of a belt layer of FIG. 1.

Referring now to FIG. 2, shown is a detailed construction of each of the belt layers 7A and 7B. The belt layers 7A and 7B are formed for one round of a tire by inclining the integral number of predetermined width strip pieces S1, S2, S3, . . . at a predetermined angle relative to the circumferential direction T of the tire, each of which is composed of a plurality of reinforcing cords f, and then joining these strip pieces together in a manner such that two adjacent strip pieces butts against each other along their longitudinal edges. Between the belt layers, the reinforcing cords f cross each other with their inclinations to the tire circumferential direction T reversed to each other.

If a length of each of the belt layers 7A and 7B is L(mm), a width of each of the strip pieces S1, S2, S3, . . . , is A(mm), and an inclined angle of each of the strip pieces S1, S2, S3, . . . , to the tire circumferential direction T is $\theta(°)$ and the number of strip pieces S1, S2, S3, . . . , is N, an inclined angle $\theta$ is set such that the number N of strip pieces S1, S2, S3, . . . , can be an integer in the following expression.

$$\theta=\sin^{-1}(N\times A/L)$$

The pneumatic radial tire constructed in the above manner employs an usual method for forming the inner liner layer, the carcass layer, the bead cores having bead fillers and a carcass band having side wall rubber by means of a band forming drum. But the belt layers are formed as shown in FIG. 3.

Figure 3:
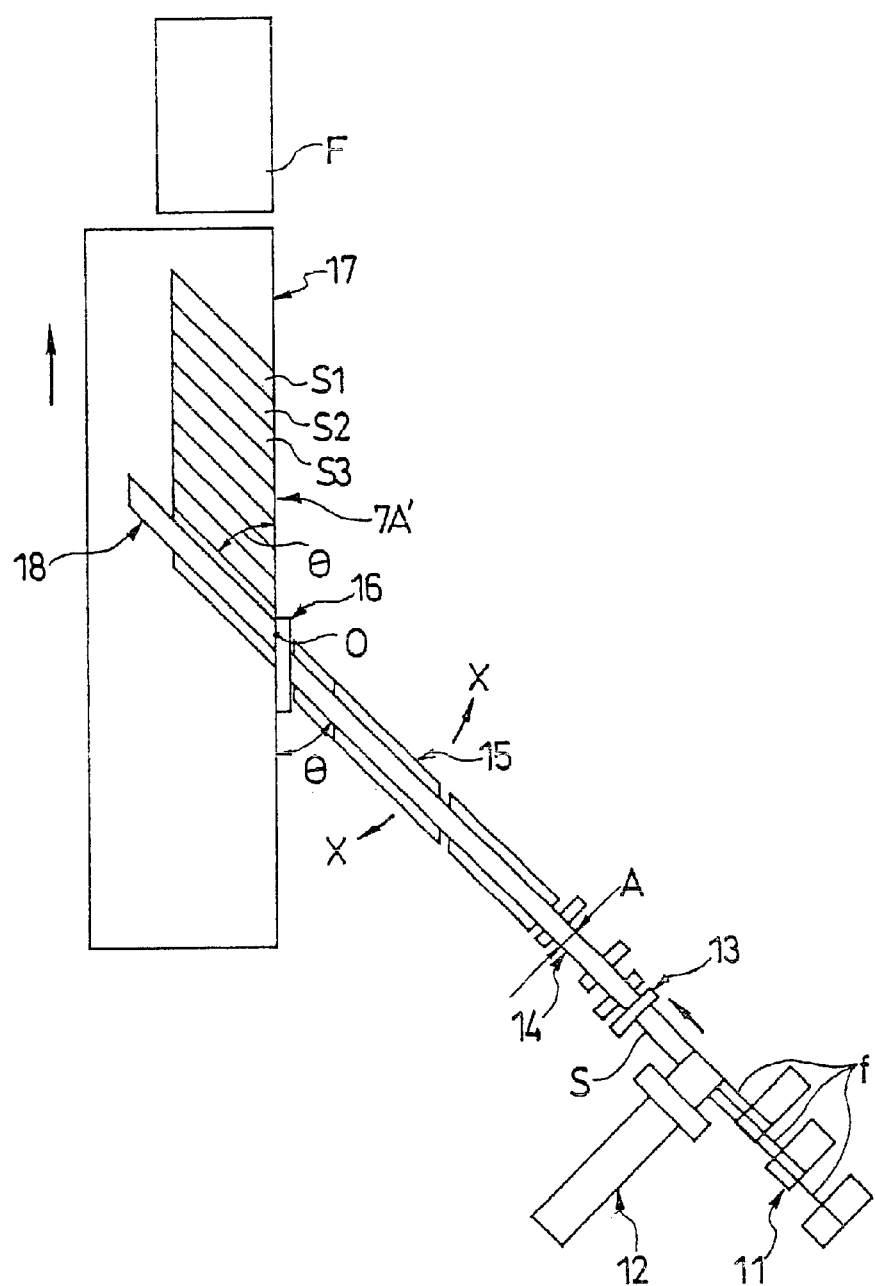
FIG. 3 is a view illustrating main portions of a pneumatic radial tire manufacturing method of the present invention.

Referring now to FIG. 3, shown is a pneumatic radial tire manufacturing method of the present invention, where reference numeral 11 denotes the creel stand for feeding a plurality of reinforcing cords f, 12; a rubber coating device for coating the reinforcing cords f with unvulcanized rubber to form a strip material S, 13; a drawing device for drawing the strip material S in an arrow direction, 14; a festooner for temporarily holding the strip material S, 15; a standard measure feeding device for intermittently carrying the strip material S, 16; a bias cutter for obliquely cutting the strip material S, 17; a carrier conveyor for intermittently carrying strip pieces obtained by cutting of the bias cutter 16 toward a belt forming drum F side and 18; a splicer for butting the sides of the strip pieces against those of the others and joining the strip pieces together. The standard measure feeding device 15 can be rotated and moved in both sides indicated by arrow directions X around a position O of the bias cutter 16 side. Thus, the standard measure feeding device 15 can adjust an angle for feeding the strip material S to the carrier conveyor 17. The standard measure feeding device 15 and the carrier conveyor 17 can alternately move the strip material S intermittently in synchronization with each other. The splicer 18 can change a direction of joining accompanied with the standard measure feeding device 15 rotated and moved so as to change the cutting angle $\theta$ of the bias cutter 16. Thus, the splicer 18 can always perform splicing along the longitudinal edges of the strip pieces.

Formation of a belt layer is carried out as follows. First, a plurality of reinforcing cords f fed from the creel stand 11 and aligned are coated with unvulcanized rubber by the rubber coating device 12 to continuously form a predetermined width strip material S. A predetermined amount of the strip material S is carried to the carrier conveyor 17 side only by a predetermined distance by the standard measure feeding device 15 via the drawing device 13 and the festooner 14. Then, the strip material S is cut to a predetermined size by the bias cutter 16 with a predetermined cutting angle $\theta$ set with respect to the longitudinal direction (feeding direction) of the strip material S, which is equivalent to the moving direction of the standard measure feeding device. The cutting angle $\theta$ is identical to the above inclined angle $\theta$ and set such that N can be an integer in the above expression. Herein, A means a width of the strip material S which is equal to a width of the strip piece. A strip piece S1 obtained by the above predetermined-size cutting is transferred to the carrier conveyor 17 and then carried thereon by an amount equal to a length of its cut surface to the forming drum F side.

After the carrying, the strip material S is carried again by a predetermined length by the standard measure feeding device 15. The strip material S carried to the carrier conveyor 17 side adjacently to the strip piece S1 is bias-cut by the bias cutter 16. Then, by the splicer 18, the strip pieces S1 and S2 are joined together by butting the side of one against that of the other. The joined strip pieces S1 and S2 are carried on the carrier conveyor 17 by length equal to that of their cut surfaces.

Thereafter, the process repeats standard measure feeding of the strip material S by the standard measure feeding device 15, cutting by the bias-cutter 16, joining by the splicer 18 and predetermined-length carrying by the carrier conveyor 17. Then, the strip pieces obtained by the cutting are joined together along their longitudinal edges in sequence on the carrier conveyor 17. In this way, a belt member 7A' is formed, which is composed of the integral number of strip pieces S1, S2, S3, . . . , of equal width, and has a length equal to the length L of the belt layer 7A for one tire. The belt member 7A' is wound on the belt forming drum F by one round to form an unvulcanized rubber belt layer 7A where the reinforcing cords f are inclined in one direction. Since a belt layer is directly formed without stocking any belt members, stock space is unnecessary. Also, since the belt layer 7A is formed by using the integral number of strip pieces S1, S2, S3, . . . , of equal width, the occurrence of material waste is prevented.

Formation of the belt layer 7B of the outer side is also carried out by inclining the reinforcing cords f in the reverse direction of the above described direction for 7A, and similarly, a belt member which is composed of the integral number of strip pieces having equal width is formed. Then, the belt member is wound on the belt layer 7A around a belt forming drum F by one round, a belt layer 7B of unvulcanized rubber is formed with the reinforcing cords f inclined in the other direction. The belt member for the belt layer 7B is cut and placed on the carrier conveyor 17 by one tire length as the same with the belt layer 7A. When the belt layer 7B is wound around the drum, the belt drum is rotated in the opposite direction of that for the belt layer 7A, and the belt layer 7B is formed.

After the belt layer formation, by using a conventional method, tread rubber is wound on the belt layer by one round and then a belt tread rubber laminated body is formed. The carcass band is deformed to be troidal by a shaping drum, and the belt tread rubber laminated body is transferred to its outer periphery. Then, the belt tread rubber laminated body is stuck to the troidal carcass band without any space left to be formed into a green tire. By curing the green tire in a metallic mold, the above described pneumatic radial tire can be provided.

When belt specifications are changed due to a change in tire specifications, a feeding length of the strip material S sent by the standard measure feeding device 15 to the carrier conveyor 17 is changed. Also, an angle θ for cutting the strip material S by the bias cutter 16 is changed according to the changed length L such that N can be an integer in the above expression. Changing of the cutting angle θ is carried out by rotating and moving the standard measure feeding device 15 around the position O and changing an angle for feeding the strip material S to the carrier conveyor 17. Since the splicer 18 is installed in the same frame as that for the standard measure feeding device, its arranging angle is changed accompanied with the angle change of the standard measure feeding device. A feeding length by the carrier conveyor 17 is also changed according to the above described angle change.

Strip pieces obtained by cutting the strip material S after the specification change are then joined together, as in the above case, while butting the sides of one piece with those of the others in sequence and thereby a belt member composed of the integral number of strip pieces is formed. Conventionally, each changing of tire specifications was dealt with by replacing a drum having taken up a long belt sheet material against another. However, according to the present invention, many kinds of tires having different sizes can be dealt with only by changing, as described above, a cutting angle θ according to a change in tire specifications. Accordingly, efficient production of many kinds in small quantities can be performed without any necessity of securing stock space for respective tire specifications and without carrying out any large-scale setup changing work.

As described above, according to the present invention, the integral number of predetermined width strip pieces S1, S2, S3, . . . , each composed of a plurality of reinforcing cords f, are inclined by a predetermined angle relative to the tire circumferential direction T, these strip pieces are joined together while both sides of one piece are butted against those of the others in sequence and thereby a belt layer for one tire is provided. Thus, a predetermined width strip material S composed of a plurality of reinforcing cords f is placed on the carrier conveyor 17 such that its feeding angle can be adjusted. The strip material S and the carrier conveyor 17 are alternately moved intermittently in synchronization with each other, and the strip material S is cut to a predetermined size in sequence to make strip pieces. The strip pieces are transferred to the carrier conveyor 17, and the sides of the strip pieces are butted against those of the others to form a belt member having a length equal to a length of a belt layer for one tire. Then, the belt member can be used as a belt layer for a tire. In addition, an angle θ for cutting the strip material S to a predetermined size is set such that N can be an integer in the above expression. Thus, even if there is a change which is made in a tire size, the changed size can be dealt with by changing a cutting angle, a cutting length and the number of joined strip pieces, and many kinds of belt layers can be formed from the same strip material. Accordingly, the conventional practice of securing space for stocking a belt member for respective tire specifications is unnecessary, the occurrence of material waste is prevented and complex setup changing work is unnecessary. Therefore, efficient production of many kinds in small quantities can be performed.

According to the present invention, for example, if a length L of a belt layer is 1800 mm and a width A of a strip material S is 10 mm, by setting a cutting angle θ to 23.9°, the number N of strip pieces can be set to 73.

If a length L of a belt layer is 1800 mm and a width A of a strip material S is 20 mm, by setting a cutting angle θ to 24.30°, the number N of strip pieces can be set to 37. Even if a tire size is changed, by similarly changing a cutting angle θ the number N of strip pieces can be set to an integer.

Reference is now made to Tables 1 to 3 below each showing an example of changing a cutting angle θ and the number N of strip pieces. Specifically, Table 1 shows a case where a length L of a belt layer is 1800 mm and a width A of a strip material S is 10 mm. Table 2 shows a case where a length L of a belt layer is 1800 mm and a width A of a strip material S is 20 mm. Table 3 shows a case where a length L of a belt layer is 1800 mm and a width A of a strip material S is 30 mm.

TABLE 1

| N | 63 | 64 | 65 | 66 | 67 | 68 | 69 | 70 | 71 | 72 | 73 |
|---|----|----|----|----|----|----|----|----|----|----|----|
| θ | 20.5 | 20.8 | 21.2 | 21.5 | 21.9 | 22.2 | 22.5 | 22.9 | 23.2 | 23.6 | 23.9 |
| N | 74 | 75 | 76 | 77 | 78 | 79 | 80 | 81 | 82 | | |
| θ | 24.3 | 24.6 | 24.9 | 25.3 | 25.7 | 26.0 | 26.4 | 26.7 | 27.1 | | |

N = Number
θ = (°)

TABLE 2

| N | 32 | 33 | 34 | 35 | 36 | 37 | 38 | 39 | 40 | 41 | 42 |
|---|----|----|----|----|----|----|----|----|----|----|----|
| θ | 20.8 | 21.5 | 22.2 | 22.9 | 23.6 | 24.3 | 24.9 | 25.7 | 26.4 | 27.1 | 27.8 |

N = Number
θ = (°)

TABLE 3

| N | 21 | 22 | 23 | 24 | 25 | 26 | 27 | 28 |
|---|----|----|----|----|----|----|----|----|
| θ | 20.5 | 21.5 | 22.5 | 23.6 | 24.6 | 25.7 | 26.4 | 27.8 |

N = Number
θ = (°)

According to the present invention, a width A of a strip material S should be set within a range of 5 to 60 mm, preferably 10 to 30 mm. A cutting angle θ should be set within a range of 15 to 45 preferably 20 to 30°. The above ranges of a width A of a strip material S and a cutting angle θ can be respectively applied to a width A of a strip piece and an inclined angle θ.

In the above preferred embodiment, the strip material S was provided by coating the reinforcing cords f supplied from the creel stand 11 with rubber by the rubber coating device 12. Instead, a long strip material S having a predetermined width formed and taken up by the drum beforehand may be also provided.

Although the preferred embodiment of the present invention has been described in detail, it should be understood that various changes, substitutions and alternations can be made therein without departing spirit and scope of the inventions as defined by the appended claims.

What is claimed is:

1. A method of manufacturing a belt member for a pneumatic radial tire comprising the steps of:

feeding a strip material including a plurality of reinforcing cords from a standard measure feeding device which is adjustable in feeding angle to a carrier conveyor;

cutting the strip material to a predetermined size in sequence to form strip pieces having a predetermined width A while alternately moving the strip material and the carrier conveyor intermittently in synchronization with each other;

transferring the strip pieces onto the carrier conveyor;

determining an integer number $N_{int}$ of strip pieces necessary to form a belt member having a desired length equal to a predetermined length L of a belt layer for the tire with the strip pieces having the predetermined width A by:

selecting a preferred cutting angle $\theta_{pre}$ for the strip pieces;

calculating a number $N_{cal}$ of strip pieces required to form the belt member by applying the following formula:

$$N_{cal} = (L/A) \times \sin \theta_{pre};$$

rounding the calculated number $N_{cal}$ of strip pieces either up or down to an integer number $N_{int}$; and setting an actual cutting angle $\theta_a$ for the integer number $N_{int}$ of strip pieces by applying the following formula:

$$\theta_a = \sin^{-1}(N_{int} \times A/L); \text{ and}$$

butting the $N_{int}$ strip pieces cut at the actual cutting angle $\theta_a$ sequentially against each other along their longitudinal edges to form the belt member having the desired length equal to the predetermined length L of the belt layer for the pneumatic tire.

2. A method of manufacturing a belt member for a pneumatic radial tire according to claim 1, wherein said strip material width A is set within a range of 5 to 60 mm.

3. A method of manufacturing a belt member for a pneumatic radial tire according to claim 1, wherein said strip material cutting angle $\theta_a$ is set within a range of 15° to 45°.

* * * * *

UNITED STATES PATENT AND TRADEMARK OFFICE
CERTIFICATE OF CORRECTION

PATENT NO. : 6,669,798 B1
DATED : December 30, 2003
INVENTOR(S) : Noboru Okada et al.

It is certified that error appears in the above-identified patent and that said Letters Patent is hereby corrected as shown below:

<u>Title page,</u>
Item [75], the 1st inventor's name should read -- Noboru Okada --

Signed and Sealed this

Sixteenth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,669,798 B1
DATED : December 30, 2003
INVENTOR(S) : Noboru Okada et al.

It is certified that error appears in the above-identified patent and that said Letters Patent is hereby corrected as shown below:

<u>Title page,</u>
Item [75], the 2nd inventors name should read:
-- Kazuyuki Kabe --

Signed and Sealed this

Twentieth Day of April, 2004

JON W. DUDAS
*Acting Director of the United States Patent and Trademark Office*